Oct. 14, 1969   B. D. INGRAM   3,472,536

COUPLING FOR CONNECTING A FLEXIBLE TUBE TO A RIGID TUBE

Filed April 10, 1968

INVENTOR.
BASIL D INGRAM
BY
*Lloyd J. Andress*

United States Patent Office 3,472,536
Patented Oct. 14, 1969

3,472,536
COUPLING FOR CONNECTING A FLEXIBLE
TUBE TO A RIGID TUBE
Basil D. Ingram, 5610 N. Miami Ave., Apt. 2,
Miami, Fla. 33127
Filed Apr. 10, 1968, Ser. No. 720,316
Int. Cl. F16l 55/00, 31/00, 33/00, 47/00, 49/00
U.S. Cl. 285—177                               5 Claims

ABSTRACT OF THE DISCLOSURE

A coupling for connecting and sealing a flexible tube or hose to a rigid tube having an outside diameter less than the inside diameter of the flexible tube. An elongated flexible strap having a pressure sensitive adhesive layer on its inner surface is wrapped around the rigid tube. A circumferentially contractable band clamp is secured around the flexible tube compressing the flexible tube and strap about the rigid tube.

---

This invention relates in general to couplings for joining flexible tubes to rigid tubes and more particularly to a linear space saving coupling for hermetically connecting a flexible hose to a rigid tube having an outside diameter less than the inside diameter of the flexible tube.

Prior devices for connecting a flexible tube or hose to a rigid tube or pipe of different diameter require a device known as a "reducing" coupling, which in itself is expensive and usually complex to install and requires linear axial space, which in some instances is not available.

The present invention overcomes the above objections and disadvantages by the provision of a relatively inexpensive elongated flexible portion of predetermined flexible and resilient sheet material having interlocking projections at its opposite ends for shaping a cylindrical sleeve, which sleeve is clamped by well known means between the outside diameter of the rigid tube and the inside diameter of the flexible tube, forming a hermetically sealed coupling.

Another object of the invention is the provision of a sleeve made from elastomer material having interlocking opposite ends for forming a hermetic junction in a coupling sleeve for providing a sealed member between tubular members of two diameters.

A further object of the invention is the provision of a cylindrical flexible sleeve positioned between the outside diameter of a rigid pipe and the inside diameter of a flexible hose including a circular clamping means for compressing the sleeve into a hermetically sealed pressure resistant coupling.

These and other objects and advantages in one embodiment of the invention are described and shown in the following specification and drawing, in which.

Figure 6:
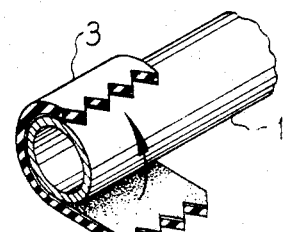
FIG. 6 is a perspective view illustrating the assembly of the sleeve shown in FIG. 3.
Figure 7:
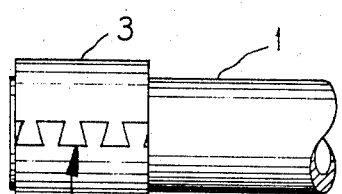
Figure 8:
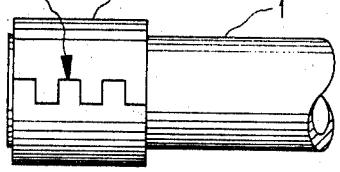
Figure 9:
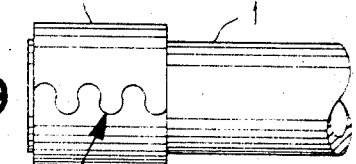

FIGS. 7, 8, and 9 illustrate three alternate junctions to the angular junction shown in FIG. 6.

Figure 1:
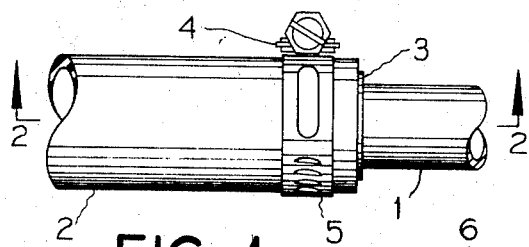
FIG. 1 is a fragmentary side elevation of the assembled coupling.
Figure 2:
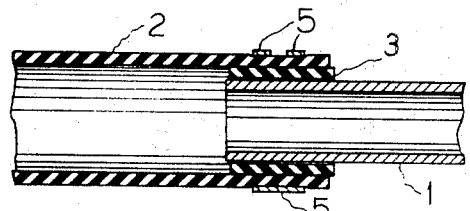
FIG. 2 is a cross sectional view taken through section line 2—2, FIG. 1.
Figure 3:
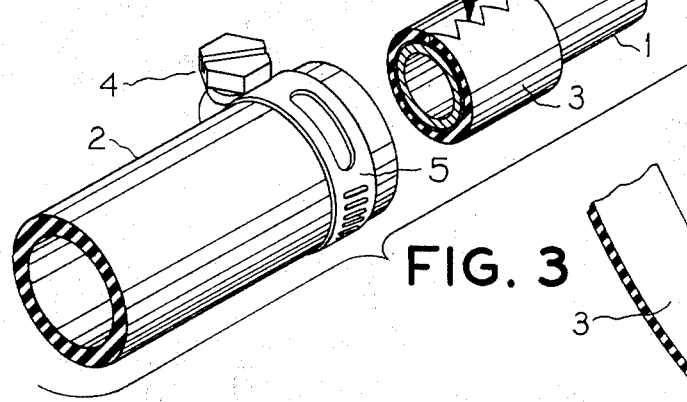
FIG. 3 is a perspective exploded view showing all elements of the coupling.

Referring to FIG. 1, a rigid tube or pipe 1 is connected to a flexible resilient hose 2 through the medium of a filler sleeve 3, made from an elastomer material such as Neoprene, and a hose clamp assembly 4, which has a peripheral band 5 with the filler sleeve of uniform thickness and having multiple mating angular projections forming junction 6, shown in FIG. 3.

Figure 4:
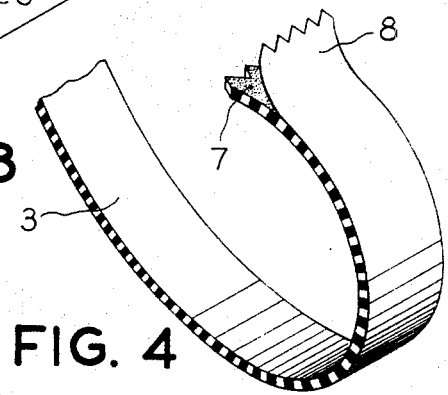
FIG. 4 is a fragmentary perspective view of an adhesive material shown in FIG. 3.

Referring to FIG. 4, the sleeve 3 is preferably coated on one side with a pressure sensitive adhesive 7, normally protected with a removable mask 8.

Figure 5:
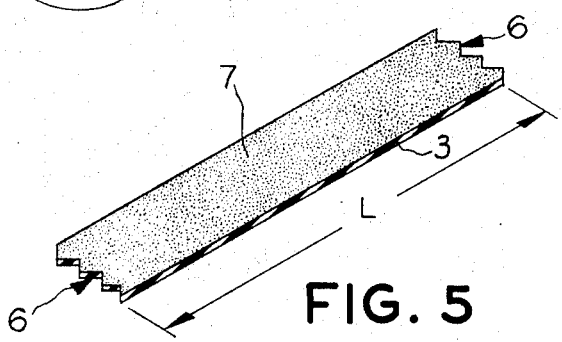
FIG. 5 is a perspective view of the sleeve shown in FIG. 3, cut from material shown in FIG. 4.

FIG. 5 illustrates a sleeve 3 cut to the exact length requirement L and provided with a projection forming junctions 6 for filling the periphery of a tube or pipe having a circumference of L, which is exactly equivalent to the circumference of the pipe 1.

FIG. 6 illustrates the application of the sleeve 3 to the end portion of pipe 1 by wrapping same thereon with the junction thereof completed, as shown in FIG. 3.

FIG. 7 illustrates the sleeve 3 having an interlocking dovetail type junction 9.

FIG. 8 shows the sleeve with a rectangular junction 10 and FIG. 9 illustrates a sleeve 3 having an interlocking multiple lobe junction 11.

It is to be noted that the adhesive 7 may be eliminated from the member 3, however in this case junctions of the type shown in FIGS. 7 and 9 are more readily secured to the pipe 1 before the insertion in hose 2.

It is also to be noted that well known hand tools may be used to cut the junction projections or the cutting members may be incorporated in well known plier form with suitable guides for the sleeve material.

Having described my invention, I claim:

1. In combination, a large diameter flexible and resilient tube to be hermetically connected to a rigid small diameter tube, said resilient tube having an inside diameter greater than the outside diameter of said rigid tube, a cylindrical sleeve formed from flexible deformable and resilient fluid impervious material having a uniform radial thickness substantially equal to half the difference between the outside diameter of said rigid tube and the inside diameter of said resilient tube, said sleeve being coaxially positioned a predetermined distance over the end portion of the outer surface of said rigid tube and coaxially positioned substantially the same distance within the end portion of said resilient tube, circumferentially contractable sleeve-type clamp means secured around the outer end portion of said resilient tube for radially and circumferentially compressing the same about said sleeve and said resilient tube and said sleeve about said rigid tube for hermetically sealing and connecting the tubes together, said sleeve being in the form of an elongated strap of said deformable and resilient fluid impervious material wrapped once completely about said rigid tube and including complementary endwise outwardly projecting and opening projections and recesses, respectively, on its opposite ends interfittingly engaged with each other so as to prevent relative axial shifting of the ends of said strap, the inner surface of said sleeve including a pressure sensitive adhesive layer adhesively bonding said sleeve to the opposing outer surfaces of said rigid tube.

2. The combination of claim 1 wherein said projections and recesses are triangular in plan shape with the apices of said projections at their outermost ends.

3. The combination of claim 1 wherein said projections and recesses are rectangular in plan shape.

4. The combination of claim 1 wherein said projections and recesses are generally truncated triangular in plan shape with the minor dimensions of each of said projections at its base end.

5. The combination of claim 1 wherein said projections and said recesses are lobe-shaped in plan with the major transverse width areas of said projections spaced outwardly of their base ends.

References Cited

UNITED STATES PATENTS

| | | | |
|---|---|---|---|
| 590,258 | 9/1897 | Dale | 285—241 |
| 1,040,039 | 10/1912 | Shapro | 285—253 X |
| 1,765,362 | 6/1930 | Berry | 285—177 X |
| 2,165,926 | 7/1939 | Greene | 285—253 X |
| 2,261,948 | 11/1941 | Beach | 285—253 X |
| 2,464,653 | 3/1949 | Phipps. | |
| 3,223,425 | 12/1965 | Leman | 227—115 |
| 3,387,839 | 6/1968 | Millet et al. | |

FOREIGN PATENTS

| | | |
|---|---|---|
| 725,513 | 1/1966 | Canada. |
| 451,119 | 7/1936 | Great Britain. |

THOMAS F. CALLAGHAN, Primary Examiner

U.S. Cl. X.R.

285—253